United States Patent [19]

Buckwalter, Jr. et al.

[11] Patent Number: 5,059,489
[45] Date of Patent: Oct. 22, 1991

[54] SURFACE MODIFIED STRUCTURES

[75] Inventors: Charles Q. Buckwalter, Jr.; Irwin M. Lachman; Mallanagouda D. Patil, all of Corning; Jimmie L. Williams, Painted Post, all of N.Y.

[73] Assignee: Corning Incorporated, Corning, N.Y.

[21] Appl. No.: 219,978

[22] Filed: Jul. 15, 1988

[51] Int. Cl.$^5$ .............................. B22F 3/10
[52] U.S. Cl. ...................... 428/550; 75/232; 419/2; 419/26; 419/29; 419/36; 419/37; 419/19; 428/545; 428/539.5; 428/472.1
[58] Field of Search ............ 419/2, 36, 19, 37, 26, 419/29; 428/550, 545, 539.5, 472.1; 75/232

[56] References Cited

U.S. PATENT DOCUMENTS

| | | | |
|---|---|---|---|
| 3,615,884 | 10/1971 | Collins | 148/126 |
| 3,920,452 | 11/1975 | Davies | 75/200 |
| 4,016,446 | 4/1977 | Cadoff | 75/207 |
| 4,071,382 | 1/1978 | Riopelle | 148/126 |

OTHER PUBLICATIONS

Adamson, Arthur W., *Physical Chemistry of Surfaces*, 1976; pp. 244–250.
Buckwalter, C. Q., "Inhibition of Nuclear Waste Glass Leaching by Chemisorption", Sep., 1982, pp. 431–436, vol. 65, No. 9.

*Primary Examiner*—Stephen J. Lechert, Jr.
*Attorney, Agent, or Firm*—Richard N. Wardell

[57] ABSTRACT

A structure comprising a mixture of metals and metal alloys which are sintered into a hard porous body is presented. The structure can be useful for many different chemical and physical purposes, such as for catalysis, desorption and absorption, and selective leaching of the structure components into solutions.

9 Claims, 2 Drawing Sheets

SURFACE MODIFIED STRUCTURES

RELATED APPLICATION

U.S. Application Ser. No. 219985, filed concurrently herewith by I.M. Lachman, M. D. Patil, J. L. Williams, and R. R. Wusirika under the title CATALYTICALLY ACTIVE MATERIALS, discloses the production of metallic catalysts integral with a structural support material which upon sintering results in a hard porous catalytically active body.

BACKGROUND OF THE INVENTION

This invention relates to a means to initiate and modify surface oxide layers in the form of metal and metal oxide layers with and without catalytic activity. The invention involves the mixing of structural metal powders with base metals, the selective mobilization of certain metals to the porous surface of the substrate body during firing, and partial to complete oxidation of the metals to form surface oxide layers.

Commonly, base metal oxides of the first and second transition series have been mixed as a unitary composition and subsequently sintered to a dense body. The resultant structure is then placed in a chemically charged environment to catalytically promote certain reaction products. It is additionally known, that the base metal oxides can be combined with a washcoat of some kind and applied to a support structure for subsequent use in a reactive environment.

The reactive environments contemplated by the present invention relate, but are by no means limited thereby, to catalytic devices and filters with high surface area catalytic reaction sites. For example, the problem of acid rain is becoming increasingly invidious to the environment. Extant is a critical need for a long term, stable device capable of catalytic activity yet resilient in the harsh environment inherent to polluting activities. Such an environment invites the use of the present invention in that the high surface areas are comprised of thin porous metal oxide layers, intimately combined with a porous metal support structure. The support structure is capable of providing unoxidized precursor metal catalysts which can be readily oxidized to form fresh catalytic activity when exposed to an oxidative environment.

Some of the problems existing in the prior art are: in substrates with coated surfaces the coating is subject to delamination thereby requiring device replacement, there is no means available to integrate a support material with a catalyst material without the problems associated with abrupt material discontinuities, there are limited means available to selectively migrate to the surface of a porous support structure certain metals, there are limited means available to engineer the surface and/or oxide layer, and there is no integration of the porous surface layers of mixed catalytically active metal oxides in combination with the precursor metal catalyst and support structure.

The present invention addresses and solves these problems of the prior art by: combining metal powders and metal catalysts, sintering to form a hard porous body with certain metals migrating to the surface of the body; formation of integral layers of metals, controlling the surface oxide composition by varying the bulk metal composition, oxidizing a certain portion of the surface to form mixed oxide layers on the surface portion; while retaining either singly or a plurality of underlying, integrally mixed layers of metal stock capable of transformation to a fresh oxide layer when exposed to an oxidative environment. The present invention provides the dynamic surface layers herebefore mentioned, yet additionally intimately combines the dynamic surface layers with a stable support structure. Such structures may be employed for many useful purposes as is disclosed hereinbelow.

SUMMARY OF THE INVENTION

This invention is directed to the dynamics and resultant structure of the several surface layers that may be associated with mixed metal, metal alloy and/or metal oxide systems. The several layers may be a combination of metal alloys, segregated metals, mixed metal oxides and segregated metal oxides. The invention contemplates a structure comprising a hard porous sintered metal and/or metal alloy body wherein said metal and/or metal alloy and/or a combination thereof consist essentially of members selected from the group in the transition series of the periodic chart whereby selected metal and/or metals are surface mobilized during firing.

Each metal/metal oxide system investigated is derived from a single metal or metal alloy or a mixed batch of metal/metal alloy powders combined with some kind of binder and water, to form a formable homogeneous unfired body. Upon firing, the binder burns out leaving the body as a porous high surface area hard metal structure. A combination of atmosphere control, surface energies and sintering temperatures during firing provides both bulk and surface mobilities of certain metal constituents in a mixed metal powder composition. The mobilities of the metals during firing (which may happen in either the oxidation firing and/or the sintering) creates within the body, segregated islands of surface dispersed metals integrally combined in a uniform metal support structure. Surface dispersed metals in this sense means metals within the first 50 microns of the exposed surface.

Due to the high porosity of the sintered body, subsequent oxidation of the structure provides surface oxidized metals on and throughout the structure. The oxidation is limited, however, to surface available metals. Those metals not available to be oxidized remain, buried under the metal oxide layers. The stock of underlying unoxidized metal provides the benefit of additional metal availability should additional metal become exposed. This possibility can occur due to abrasion, ablation, physical, chemical, and erosive forces.

Additionally, the contiguous metal/metal oxide layering creates a layered structure with decreased interfacial energies at the metal/metal oxide interface. Decreased interfacial energies provide more stable interfaces which ultimately provides a more stable, integrated composite structure. This stability provides a structure that may be used in many corrosive environments without the risk of surface delamination.

The present invention provides active metal oxide layers ranging in thicknesses up to 25 microns. These layers are intimately fixed to the stock of unoxidized precursor metal and/or metal catalysts. These metal oxide layers are dispersed throughout the support structure at or near the surface of the porous body. The oxide layers and the support structure exhibit porosity in the range up to 75%. The base metal powders may be derived from the metals in the transition series of the chemical periodic chart. Metals such as, chromium, cobalt, copper, iron, lead, manganese, molybdenum, nickel, niobium, tantalum, titanium, tungsten, vanadium, zinc, zirconium, rare earth metals, and alloys therebetween and mixtures thereof, to name a few. However, any metal or metal alloy system, such as rare earth metals and various steels and stainless steels, capable of being sintered into a porous body, or capable of being an inclusion into such a porous sintered body, that will form a similar metal/metal oxide combination with properties similar to the transition series are contemplated as within the scope of the invention.

It is further noted that catalytic activity exhibited in the potpourri of oxidized metals in the surface layers are enhanced by the synergism of mixed catalytic sites on the surface of the structure. For example, where a layer of titania promotes a certain rate of catalytic activity, it has been found that a mixture of vanadia and titania within the surface layers promotes an accelerated rate of reaction for certain chemical species. The specific mechanism, while not uncovered here, sensibly relates to the reactants present in the chemical effluent to be converted, as well as the crystallographic structure of the phases. A monolithic catalyst system, for example, can only be directed to certain reactants in a stream of pollutants. The extant polluted environment is a mixture of reactants.

By the invention herein presented, the oxidized surface layers may be tailored to a pollution stream. Prior analysis of the pollutant reactions to be catalyzed will determine the mixture of precursor metal catalysts that should be incorporated into the metal powder batch. Taking full advantage of mixing various compatible alloy systems, the surface energies provided by the high surface area structure, and the metal mobility caused by a controlled atmosphere, surface energies, and sintering temperatures, a mixed catalytic surface may be presented to the reactant effluent for conversion into a less noxious chemical species.

Not to be excluded, however, are the systems that require one specific catalyst. The present invention contemplates both monolith means of catalysis and multiple means of catalysis. The requirement for catalysis is solely limited to the chemical species of desired conversion. This includes all manner of catalysis where a thin layer, high surface area oxide catalyst is required, or any other anionic species capable of reacting with a metal surface to produce efficacious catalysis.

Advantageously, the structural metals comprise elements and alloys of those elements from the first and second transition series of the periodic chart. Iron alloys are of particular interest for this use, due to their availability and relative ease of sintering into porous hard bodies. Metals such as titanium can provide the dual purpose of structural and catalytic functions.

As is well known to those in the surface layer art, metal oxides with high surface areas present surface charge densities which, when averaged over the surface area of a micron thick charged layer (such as a Stern layer), create a unified surface charge density. As the range of chemical species are varied at the surface, a range of charge densities may be varied on the surface. The creation of modulated charge densities on the surface of high surface area structures provides a means for molecularly engineering the surface charge densities of structures for specific chemical and physical interactions. Therefore, a structure comprising a hard porous sintered metal and/or metal alloy body wherein the surface layer of said body possesses a charge density that varies as the metal oxide concentration of said surface layer varies, is contemplated.

Additionally, a means is created to offer different chemical and physical active sites on the surface which can then be modified by different charge densities. These several interactions can be directed for purposes of catalysis or simply to attract a specific chemical species for purposes of binding the species to the surface at selective binding sites for manipulation other than for catalysis reasons.

For example, in biological systems, species in solution are sensitive to slight variations in the charge densities of high surface area structures. Proteins often exhibit different electrical charges in aqueous solutions which can be affected by the charge density of a high surface area oxide layer. By presenting an in situ environment with a surface area containing area modulated charge density, protein mobilities toward that surface will be enhanced, inhibited, or species will be preferentially oriented in solution dependent upon the charge of the protein mobile species and the nature of the surface electrical double layer (An electrical double layer is commonly created in an oxide/aqueous solution system). Subtle variations in surface charge densities can be used as a separation technique, in that kind of environment, by simply binding specific species. In such a separation, the surface acts as a filter to selectively bind preferred species. The invention, herein, contemplates modulation of the surface energies and surface charge densities on a high surface area, hard porous body in aqueous and organic solutions.

Chemical separations of inorganic species are also contemplated, since the range of surface charge density variations are large enough to attract or repulse cations and anions in inorganic aqueous solutions, as well.

Additionally, the engineered surface can selectively absorb and desorb, providing a steady stream of certain chemical species dependent upon the pH and concentration of the leachate solution. The design of the unoxidized surface concentrations are facilitated for this purpose by reference to Pourbaix diagrams which show the dissolution characteristics of metals as a function of pH. A tailored surface could be chosen either in the layered oxide form or used as a porous sintered reduced metal body. The porous metal body would be useful to leach metals into a solution at a constant rate. Therefore, a structure comprising a hard porous sintered metal and/or metal alloy body wherein said body is a concentration source in a solution for selectively leaching said metals and/or metal alloys into a solution is contemplated.

Various methods of using engineered surface layers as disclosed by the present invention are contemplated. Not meant as limitations, but for illustration purposes a method for sorbing and desorbing, to and from, the surface of a hard porous sintered metal and/or metal alloy body wherein the surface layer of said body possesses a charge density that varies as the metal oxide concentration of said surface layer varies whereby said surface layers create reactive sites for biochemical molecules for separation and fixation reactions. Additionally, a method of using a structure comprising a hard porous sintered metal and/or metal alloy body wherein said body is a concentration source in a solution for selectively leaching said metals and/or metal alloys into a solution is contemplated. Other methods of using the novel structure for a reactive surface can be construed by those skilled in the surface layer art.

The method of making the hard porous sintered metal powder bodies and specific compositions related to such bodies are described in copending patent application Ser. No. 07/219,985 Lachman, Patil, Williams, Wusirika, 31-2-1-13, filed July 15, 1988, which is herein incorporated by reference in its entirety as filed.

DESCRIPTION OF THE PREFERRED EMBODIMENTS

Metal powder samples were mixed and fired as described in the above-noted application Ser. No. 07/219,985. Samples of the structures were analyzed by Scanning Electron Microscopy (SEM), Electron Scattering for Chemical Analysis (ESCA), and Secondary Ion Mass Spectrometry (SIMS).

EXAMPLE 1

In Example 1, 960 grams metal powder is composed by weight of 10% iron-tungsten alloy, 10% iron-vanadium alloy, and 80% iron-titanium alloy (82% tungsten. 50% vanadium, 70% titanium, respectively, −325 mesh, Shieldalloy Corp, Newfield, NJ). The metal powder mixture was mechanically dry mixed with 96 grams of methlycellulose, 6 grams of zinc stearate, and 7.2 grams of oleic acid. The mixture was milled for 20 minutes with 195 ml of distilled water to a plastic consistency. The plasticized batch was extruded to form spaghetti extrudates and then extruded to form honeycomb monoliths. The honeycombs were dried in ovens at approximately 100° C. The dried honeycombs were placed in a furnace and sintered to a unitary composite body by firing for 0.5 hours at 1125° C. in a reducing atmosphere composed of forming gas (92% $N_2$, 8% $H_2$). Alternatively, the honeycombs could be sintered in an inert atmosphere, such as argon, under the same firing conditions.

The surfaces of the honeycombs were oxidized by firing in air for 6 hours at 600° C. to produce catalytically active tungsten and vanadium (titania was partially active).

EXAMPLE 2

In Example 2, 960 grams of iron-titanium powder (70% titanium, 325 mesh, Shieldalloy Corp), and 240 grams of iron-tungsten powder (82% tungsten, −325 mesh, Shieldalloy Corp) were dry mixed with 96 grams of methylcellulose, 6 grams of zinc stearate, and 7.2 grams of oleic acid. The mixture was mulled for 20 minutes with 190 ml of distilled water. The resultant plasticized mixture was dried, extruded into spaghetti, the spaghetti extruded into a cylindrical honeycomb. The honeycomb was dried, sintered, and oxidized in a manner similar to Example 1, above.

EXAMPLE 3

In Example 3, 960 grams of iron-titanium powder and 240 grams of iron-vanadium powder were mixed with methyl-cellulose, zinc stearate, and oleic acid and mulled for twenty minutes, as above. The Example was further extruded, dried, sintered, and oxidized, as above.

EXAMPLE 4

In Example 4, 1620 grams of iron-titanium powder and 180 grams of copper powder (Alcan, about 3µin diameter) were mixed and mulled with the above additives. The Example was further extruded, dried, sintered, and oxidized, as above.

EXAMPLE 5

In Example 5, 960 grams of iron-titanium powder and 240 grams of chromium-tungsten powder were mixed and mulled with the above cited additives. The Example was further extruded, dried, sintered, and oxidized, as above.

EXAMPLE 6

In Example 6, 1620 grams of iron-tungsten powder and 180 grams of nickel powder (Alcan, 3µ) were mixed and mulled with the above cited additives. The Example was further extruded, dried, sintered, and oxidized, as above.

Figure 1:
FIG. 1 shows an SEM micrograph of 500×maganification of Example 1.

FIG. 1 shows an SEM micrograph of 500× magnification of Example 1. Point A shows a tungsten/tungsten oxide island, point B shows an island of titanium surrounded by its oxide layer, point C shows an island of vanadium also encased in an oxide layer. The titania layers in Example 1 range from 0.5 to 5 microns. The oxide layer of vanadium is thinner, approximately b 0.1 microns, than those of tungsten and titania and is better seen in FIG. 2, at a magnification of 2000×, at points A and B. FIG. 3 is a magnification of 100×, and is shown to illustrate the porosity of the structure.

Figure 2:
FIG. 2 shows an SEM micrograph of 2000× of Example 1.
Figure 3:
FIG. 3 shows an SEM micrograph of 100× of Example 1.

The SEM micrographs of FIGS. 1-3 indicate that there are dispersed segregated islands of catalysts in the form of metal/metal oxides and that the structures are highly porous, presenting a high surface area. The mixture of oxides such as these creates a variable charge density.

Figure 4:
FIG. 4 shows an SEM micorgraph of 500× of Example 2.

FIG. 4 shows an SEM micrograph of 500× magnification of Example 2, which is a metal powder composed by weight of 80 % iron-titanium alloy and 20% iron-tungsten. Example 2 has been sintered but has not been oxidized. Point A is titanium without a detectable oxide layer and Point B is tungsten without a detectable oxide layer. The porosity of this sintered sample is evident in the micrograph.

Figure 5:
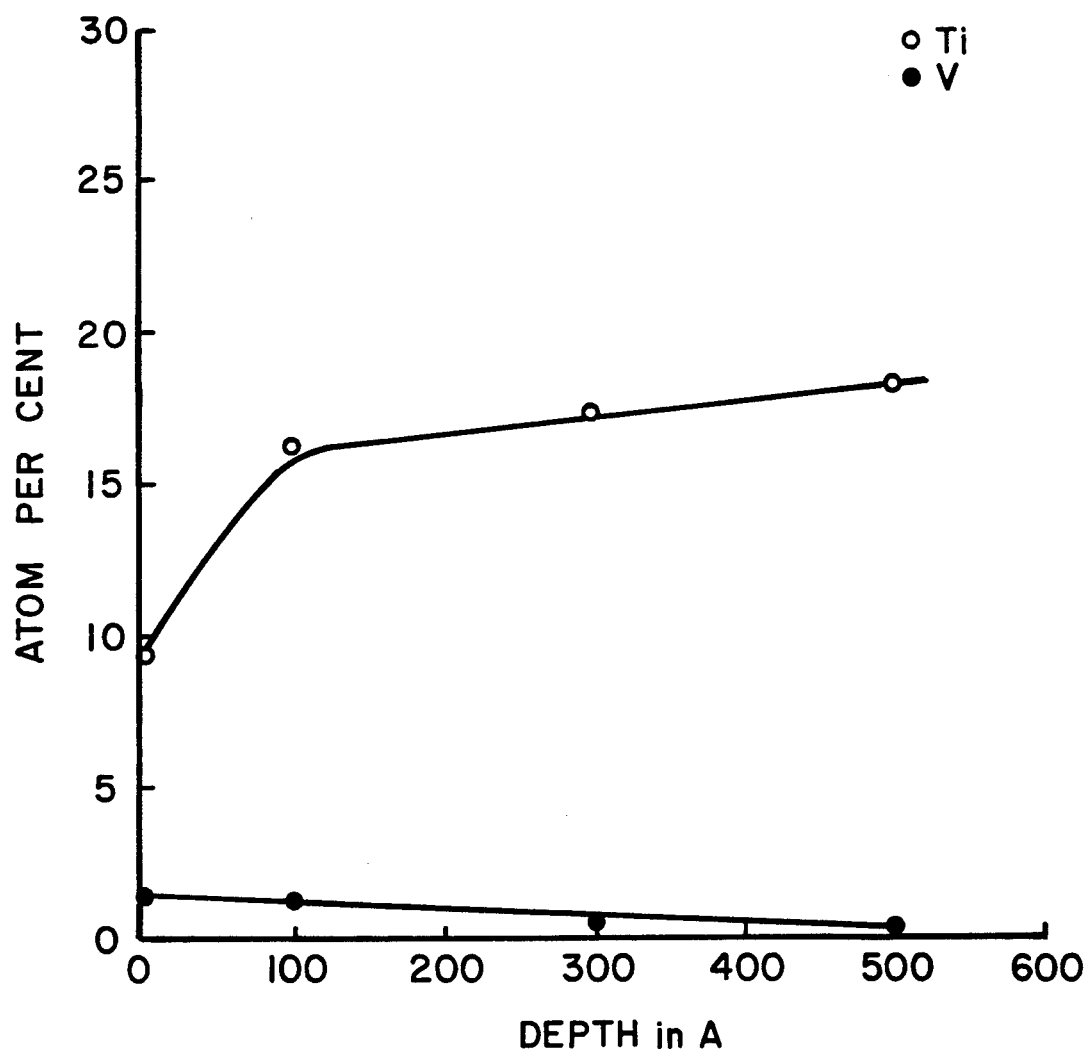
FIG. 5 shows a graph of the relative proportions of Vanadium and Titanium found at the surface.

FIG. 5 is a graph of the relative proportions of metals found on the surface of Example 1, penetrating into the bulk concentrations of the structures as detected by ESCA. Prominent is the enhanced concentration of vanadium found at the surface. Vanadium is apparently very mobile as the body sinters. The vanadium concentration enhancement drops markedly as bulk properties are approached for the remaining constituent metals. Vanadium mobility to the surface significantly decreases the bulk concentrations of vanadium.

The ESCA results indicate that certain metals, such as vanadium in this alloy system, preferentially migrate to the surface. Were this not so, bulk concentrations would be evidenced at the surface and the bulk profiles would be flat.

The SIMS data reflects the results of the ESCA profiles. The relative strength of the atomic signals indicate that vanadium is surface enhanced. The SIMS data is less reliable due to the porosity of Example 1 and the resolution due to the SIMS analysis beam.

Surface analysis reveals that certain metals in the mixed metal structures are more mobile than others and that this mobility tends toward the surface of the structure. The SEM micrographs clearly reveal that the metals are encased in an oxide layer of a porous structure, and that the oxide layers vary from metal to metal, and even within the same metal. The structures, however, maintain a metal core to the oxide layer that if exposed could be further oxidized to afford chemical interaction. The above examples are intended only to illustrate the invention herein and are not intended as a limitation.

For the various workings of these structures the following would result:

EXAMPLE 7

Example 7 would be comprised of an iron alloy sintered into a high surface area structure. Such a structure put in an aqueous solution would oxidize to iron oxide. Iron oxide forms an unstable oxide formation on iron substrates. Subsequently, the iron oxide spalls off the substrate into solution as an insoluble colloid. Such colloidal suspensions could then be used to control the amount of silica species in solution, since iron readily complexes with silica. Silica solubility could then be metered by the amount of colloidal iron oxide in solution. The underlying iron stock in the substrate would provide a continuous source of iron oxide to the aqueous solution for dissolved silica.

EXAMPLE 8

Example 8 would be comprised of a lead alloy. As could be determined from a Pourbaix diagram, dependent upon the pH of the solution, the lead species which forms from the dissolution reaction may be any of the common lead oxidation states. At certain pH ranges, approximately 10.6, lead is known to form a positively charged oxide particle in solution. Such particle can then be physisorbed onto the surface of negatively charge surfaces, thus neutralizing the charge density at that surface. By using the structure contemplated in the present invention, a constant stock of the lead mixture would be available to the solution.

EXAMPLE 9

Example 9 could be comprised of a mixture of transition metal. Once oxidized the surface becomes active to proteins that may be in solution. Such activation will preferentially orient the proteins in solution or may, rather, chemisorb or physisorb the proteins to the activated substrate, dependent on the charge density on the surface. Once effectively held in place on the substrate, the unattached end of the protein could be reacted with a desired reactant to produce the desired product. To release the protein an adjustment of the pH of the solution could be effected.

We claim:

1. A structure comprising hard porous sintered metal, metal alloy, and/or combinations thereof consisting essentially of at least two members of the transition metals of the periodic chart of elements with differing surface energies, whereby the member or members with lower surface energy have formed a stable support and at least a portion of the member or members with higher surface energies have migrated to the surface of the solid areas of the porous structure.

2. The structure of claim 1 wherein said member or members having higher surface energies comprise a surface layer of metal oxide or a plurality of surface layers of metal oxides on said member or members.

3. The structure of claim 1 wherein at least a portion of the higher surface energy member or members migrated to the surface during sintering.

4. The structure of claim 3 wherein at least a portion of the higher surface energy member or members can migrate to the surface during oxidative firing, or subsequent high temperature use.

5. The structure of claim 1 wherein the metal with higher surface energy is vanadium.

6. The structure of claim 2 wherein said metal oxide layer is up to 25 micrometers thick.

7. The structure of claim 2 wherein said metal oxide layer is catalytic.

8. The structure of claim 2 wherein said metal oxide layer is chemically and/or physically absorptive.

9. The structure of claim 2 wherein said metal and metal oxide are integral.

* * * * *

UNITED STATES PATENT AND TRADEMARK OFFICE
CERTIFICATE OF CORRECTION

PATENT NO. : 5,059,489

DATED : October 22, 1991

INVENTOR(S) : Charles Q. Buckwalter, Irwin M. Lachman, Mallanagouda D. Patil, Jimmie L. Williams It is certified that error appears in the above-identified patent and that said Letters Patent is hereby corrected as shown below:

Col. 4, line 17, should read delete "area" and insert --a--.

Column 5, line 15, -- micorgraph -- should read -- micrograph --.

Column 6, line 36, omit -- b --.

Column 7, line 47, -- charge -- should read -- charged --.

Signed and Sealed this

Eleventh Day of May, 1993

Attest:

MICHAEL K. KIRK

Attesting Officer     Acting Commissioner of Patents and Trademarks